United States Patent Office 3,494,185
Patented Feb. 10, 1970

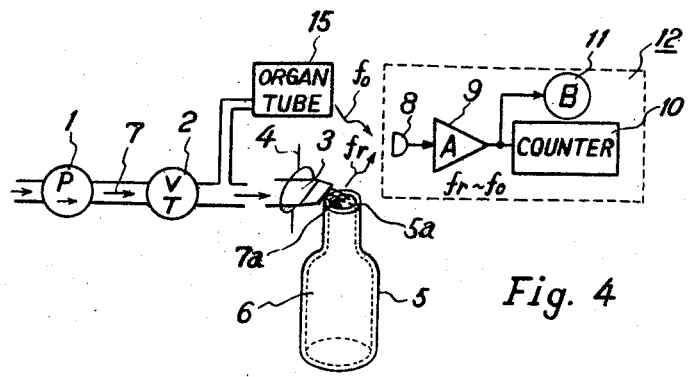
*Fig. 4*
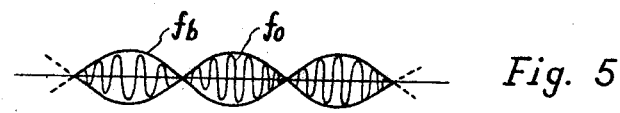
*Fig. 5*
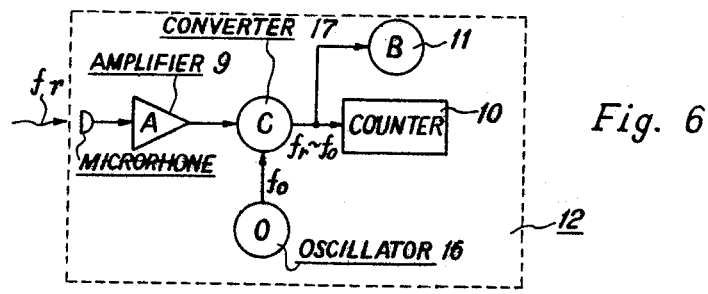
*Fig. 6*
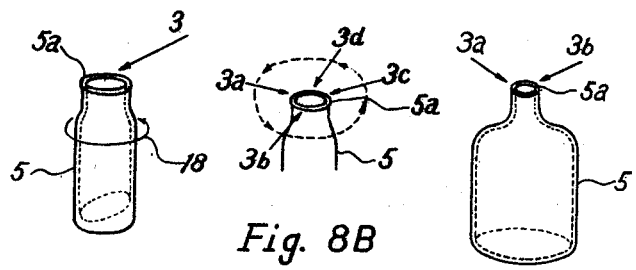
*Fig. 8A*   *Fig. 8B*   *Fig. 8C*

3,494,185
MEASURING SYSTEM FOR THE VOLUME AND DEFORMATION OF A BOTTLE OR BOTTLES
Akira Watanabe and Kunio Saeki, Tokyo-to, Japan, assignors to Toyo Glass Kabushiki Kaisha, Osaka-shi, Japan, a joint-stock company of Japan
Filed July 31, 1968, Ser. No. 749,133
Claims priority, application Japan, Feb. 29, 1968, 43/12,560
Int. Cl. G01f 17/00
U.S. Cl. 73—149                                8 Claims

ABSTRACT OF THE DISCLOSURE

A measuring system for the volume and deformation of a bottle or bottles, where a nozzle located in an appropriate position against the opening of the bottle delivers a uniform flow of air to generate a pure resonance tone from the bottle by adjusting the flow rate of the air to an appropriate value. The internal volume of the bottle and/or the deformation of the bottle is/are detected by measuring the frequency of the resonance tone in consideration of a pre-measured relationship between deviations of the internal volume and of the resonance frequency.

---

This invention relates to a system for measuring the volume of bottles and more particularly to a system for measuring or detecting the volume or deformation of bottle-like vessels.

In case of measuring the volume of bottles at their manufacturing processes, there have been heretofore adopted the following measurement systems: i.e.; (i) a system for indirectly measuring the volume from the measured weight of bottles, or (ii) a system for measuring, after compensation for temperature deviation, the volume from the volume of liquid introduced into the bottle until the liquid reaches a predetermined level. In the conventional measurement systems, however, a relatively long time is necessary to obtain a measurement result while the precision of the measurement result is generally low. In other words, the former system cannot detect the deviation of volume caused by the deformation of bottles. In the latter system, since the measurement of liquid level has personal errors, it is very delicate to obtain a correct result. Moreover, since fragile devices are generally employed in this system, they are inconvenient to handle. Furthermore, a relatively long time and complicated treatments are necessary to obtain the final result from measured data. Accordingly, it is almost impossible that the conventional measurement systems are applied to on-line systems where the volume of each bottle travelled on an assembly-line production is measured to check the quality of mass-producted manufactures and to exclude inferior products.

It is an object of this invention to provide a system for measuring speedily and correctly the volume of bottles having the same formation and for detecting simultaneously the deformation of bottles.

Another object of this invention is to provide a system for measuring the volume of bottles travelling on an assembly-line mass-production.

The principle, construction and operation of the system of this invention will be better understood from the following discussion in conjunction with the accompanying drawings, in which the same or equivalent parts are designated by the same character, numeral or symbol, and in which:

FIG. 4 is a block diagram for describing another example of the system of this invention;

FIG. 5 is a wave-form diagram for describing the operation of the system shown in FIG. 4;

FIG. 6 is a block diagram for illustrating a modification of detection means employed in the system of this invention;

FIGS. 8A, 8B and 8C are rough perspective views for describing modifications of the system of this invention.

Figure 1:
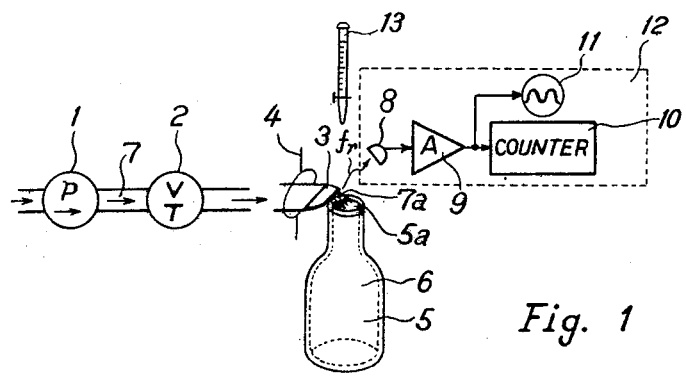
FIG. 1 is a block diagram for describing an example of the system of this invention.
Figure 2:
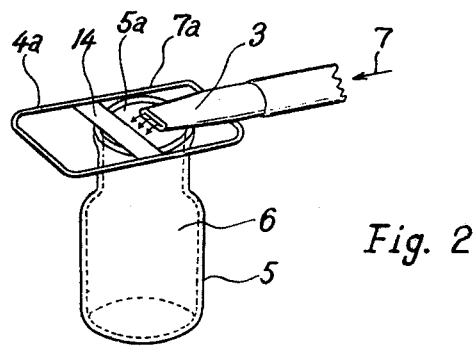
FIG. 2 is a perspective view for illustrating examples of parts to be employed in the system of this invention.

With reference to FIG. 1, the principle of this invention will first be described. The system shown in FIG. 1 comprises a constant delivery pump compressing and delivering a gas 7, such as the air, a throttle valve 2, a nozzle 3, a holder 4 for the nozzle 3, a bottle 5 to be measured, and a frequency measurement device 12 for the vibration frequency of an acoustic wave. In this system, if the air of constant flux is delivered from the nozzle 3 under an appropriate pressure (e.g.; 0.01 kilogram/centimeter) by adjusting the output pressure from the throttle valve 2 and is blown against the edge of the opening 5a of the bottle 5, this delivered air flux 7a becomes "eddy currents" and an edge tone is generated. Since this edge tone includes a number of frequency components such as "white noise," the air in the bottle 5 is vibrated by the frequency components. The bottle 5 acts as a resonator, so that one of the frequency components which corresponds to an interger multiple of the resonance frequency of the resonator is amplified. In this case, the frequency component is most amplified if it corresponds to the fundamental resonance frequency of the resonator. Accordingly, when the air flux 7 increases and the excitation of the resonator (the bottle 5) by the edge tone exceeds a threshold value, a resonance tone is generated from the opening 5a of the bottle 5. As the result of our tests, it has been well-ascertained that the frequency $f_r$ of this resonance tone varies with the shape (sep. the area and shape of the opening 5a) and in inverse proportion to the internal volume 6 of the bottle for the same shape of the bottle as illustrated below with reference to some test results. Therefore, if the relationship between the internal volume 6 and the resonance frequency $f_r$ is measured in advance for each of desired shapes of the bottle 5, the internal volume 6 of a bottle 5 to be measured can be known by utilizing the measured relationship. The resonance frequency $f_r$ is not always the fundamental resonance frequency of the bottle 5 and may be one of the harmonic frequencies of the fundamental resonance frequency. However, the resonance tone generated in the case of resonance to the fundamental resonance frequency has a low phone and is stable while the air flux from the nozzle 3 may be adjusted to a small value.

The generation efficiency of the edge tone can be increased by reducing the bore of the nozle 3 or by making the bore of the nozzle 3 flat. Moreover, the generation efficiency of the edge tone can be further raised if a thin flat film or plate 14 of metal, etc., is provided at the periphery of the outlet of the nozzle 3 so that the surface of the film or plate 14 is arranged along the direction of the air flux delivered. A frame 4a is employed as a holder for locating the outlet of the nozzle 3 and the film or plate 14 in their appropriate positions against the opening 5a of the bottle 5 for high generation efficiency of the edge tone. In this case where the film or plate 14 is arranged at the periphery of the outlet of the nozzle 3, the edge tone is also generated from the edge of the film or plate 14. Accordingly, mutual position relationship between the outlet of the nozzle 3 and the opening of the bottle 5 to be measured is not necessarily limited to a strict condition while the outlet of the nozzle 3 must be positioned as illustrated in FIG. 1 in the case of no use of the film or plate 14. Moreover, the edge tone can be generated by means of the film or plate 14 irrespectively of the shape of the opening of the bottle 5. Therefore, this film or plate 14 is very convenient in the case where quality control for a number of bottles travelling on a process in the assembly-line mass-production is carried out in an on-line system.

As the frequency measurement device 12, a suitable device may be adopted. One example of this device 12 shown in FIG. 1 comprises a microphone 8, an amplifier 9, a frequency counter 10. An oscilloscope 11, such as cathode-ray oscilloscope, may be employed to watch the input wave form of the counter 10. The resonance tone generated from the bottle 5 to be measured is converted to an electric signal by the microphone 8 and then amplified by the amplifier 9 to count the frequency $f_r$ of the resonance tone (i.e., the electric signal).

If the electric signal is converted to a pulse signal having a frequency $f_r$ and the number of pulses in one second is counted by the counter 10, the resonance frequency of the bottle 5 tested can be directly indicated. If the counting time is further lengthened, a more precise result can be obtained.

Figure 3A:
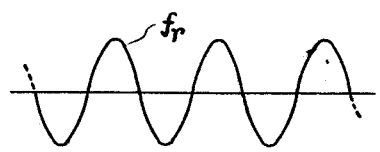
FIGS. 3A and 3B are wave-form diagrams for describing the opeartion of the system of this invention.
Figure 3B:
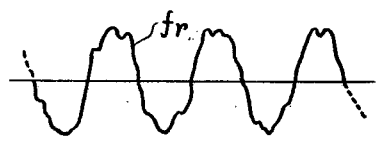

In this case, if the flux of the delivered air current $7a$ from the nozzle 3 is adjusted to an appropriate value by the throttle valve 2 so as to generate the resonance tone with a minimum flow rate of the air determined experimentally as mentioned above, the resonance tone becomes almost a single frequency component and can be observed on the oscilloscope 11 as a sinusoidal wave such as shown in FIG. 3A. This condition is most suitable to count the resonance frequency. However, even if a few number of harmonic components of the fundamental resonance frequency are included in the electric signal as shown in FIG. 3B, the above-mentioned frequency measurement can be performed without trouble if the ratio of the amplitude of the fundamental frequency component to the amplitude of the harmonic frequency components is considerably large. Since the frequency deviation range of the resonance frequencies of respective bottles 5 is relatively narrow, the resonance frequency $f_r$ can be measured in a good signal-to-noise ratio if the amplifier 8 has a band-pass characteristic covering over the frequency deviation range.

With reference to FIG. 4, another example of the frequency measurement device 12 will be described. In this example, an acoustic source generating a tone of a reference frequency is employed. As the acoustic source, an organ tube 15 is used to generate a resonance frequency $f_o$ corresponding to the normal internal volume of the bottles 5 to be measured. Since the organ tube 15 generates the reference frequency $f_o$ by being blowed with the air flux 7, the device 12 counts a beat frequency $f_b$ between the frequencies $f_o$ and $f_r$. In this case, such beat pattern is observed on the oscilloscope 11 as shown in FIG. 5. In this example, the resonance frequency $f_r$ can be measured and determined by human ears by monitoring the beat frequency $f_b$ without the frequency measurement device 12.

The beat frequency $f_b$ between the frequencies $f_r$ and $f_o$ can be measured in the state of electric signal by another frequency measurement device 12 shown in FIG. 6. In this device 12, an oscillator 16 generating the reference frequency $f_o$ and a frequency converter 17 are further provided. Since the beat frequency $f_b$ is derived from the converter 17 as a difference frequency between the frequencies $f_o$ and $f_r$, the counter 10 counts the beat frequency $f_b$.

In the above-mentioned frequency measurement device 12 using the reference frequency $f_o$, the beat frequency $f_b$ (i.e., the difference frequency between the frequencies $f_o$ and $f_r$) is measured irrespectively of a higher or lower resonance frequency $f_r$ than the normal resonance frequency $f_o$. However, this measurement principle is very convenient in the case where the quality control of the bottles 5 is carried out under a predetermined range covering the upper and lower allowance than the normal internal volume.

Figure 7A:
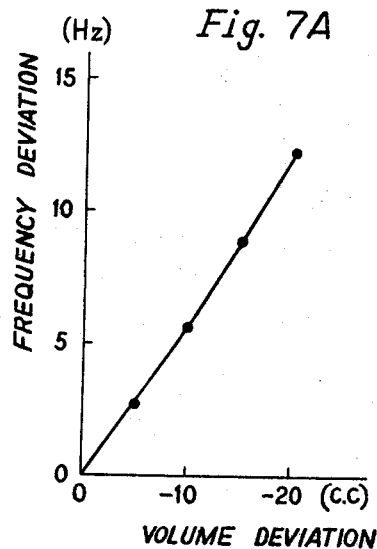
FIGS. 7A, 7B and 7C are characteristic curves for describing the operation of the system of this invention.
Figure 7B:
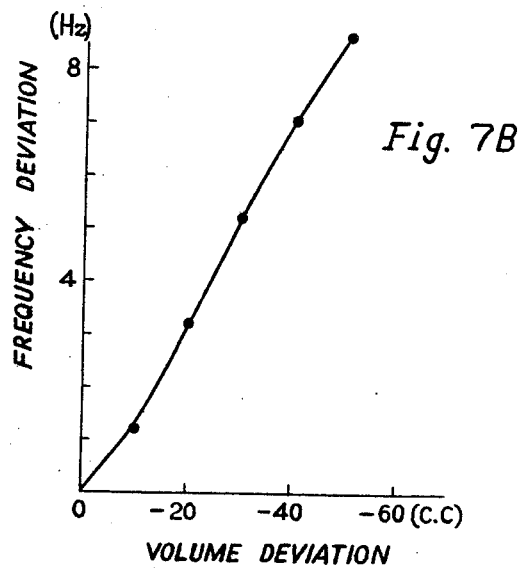
Figure 7C:
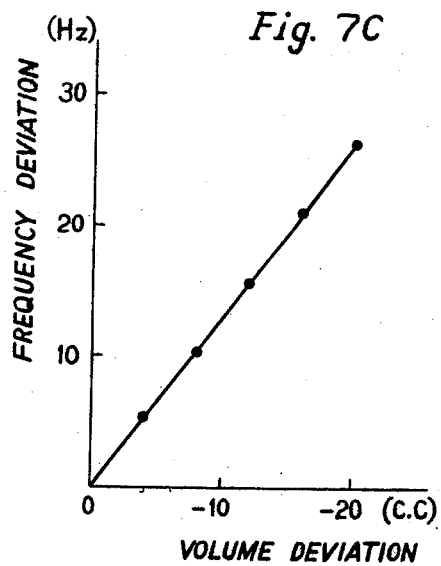

FIGS. 7A, 7B and 7C show measurement results of the system of this invention. These results are obtained from the system shown in FIG. 1 where the respective internal volumes of the bottles 5 filled with the air are successively reduced by pouring distilled water into the respective bottles 5 after measuring by a burette 13 and the relationship between deviations of the internal volume and of the resonance frequency $f_r$ are measured. FIG. 7A shows the test result for a bottle 5 having an empty internal volume 212 cubic centimeters and a resonance frequency 246 Hz. FIG. 7B shows the test result for a bottle 5 having an empty internal volume 515 cubic centimeters and a resonance frequency 149 Hz. Moreover, FIG. 7C shows the test result for a bottle 5 having an empty internal volume 185 cubic centimeters and a resonance frequency 437 Hz. Each of plotted points shows an average value obtained from ten tests under the same condition. It is further ascertained that similar test results can be obtained for the same kind of bottles 5 respectively. In each of the test results, since the deviation (c.c.) of the internal volume and the deviation (Hz.) of the resonance frequency $f_r$ have substantially linear relationship and the resonance frequency $f_r$ increases in accordance with the decrease of the internal volume, the resonance frequency $f_r$ varies substantially in inverse proportion to the deviation of the internal volume. From these test results, it will be understood that deviations of he internal volume and of the resonance frequency have also a substantial linear relationship in case of increasing the internal volume. Accordingly, if an allowable deviation of the resonance frequency for each type of the bottles 5 are predetermined in consideration of the allowable deviation of the internal volume, the quality control for the internal volume of the bottles 5 can be performed. In this case, if the above-mentioned frequency measurement using the reference frequency $f_o$ is adopted to measure the beat frequency $f_b$ between the frequencies $f_o$ and $f_r$, succeeding processes can be performed in conveniently since a constant beat frequency $f_b$ can be determined as the allowable deviation irrespectively of the higher or lower resonance frequency $f_r$ than the normal resonance frequency $f_o$.

If a selection device is controlled from the measurement result of the system of this invention, standardized bottles and non-standardized bottles can be automatically separated. In other words, the above purpose can be attained by inserting a certain automatic selection device in a process of the on-line system so that the respective internal volumes of all travelled bottles are measured to control the automatic selection device so as to exclude the non-standardized bottles only.

In reducing to practice the system of this invention, it is desirable that the outlet $7a$ of the nozzle 3 be always located so as to have the same position against the opening $5a$ of the bottles 5 since the resonance frequency $f_r$ varies about 1 Hz. in response to deviation of their mutual position-relationship. As understood from the above description, the resonance frequency $f_r$ varies in accordance with deformation (including the deviation in size) of the shape of the bottle. If this deformation is too large, the resonance tone cannot be detected even if the above position relationship is maintained. Accordingly, the deformation of the bottle can be detected by the system of this invention together with the deviation of the internal volume of the bottle.

Moreover, it is ascertained that the resonance frequency $f_r$ varies in accordance with the direction of the air flux delivered from the nozzle 3 if the bottle 5 has an uneven thickness of the bottom. Accordingly, if the bottle 5 is rotated along an arrow 18 under the constant position relationship between the opening $5a$ and the nozzle 3 as shown in FIG. 8A, or if a plurality of nozzles 3a, 3b and 3c deliver successively a uniform flow of gas as shown in FIG. 8B by dotted arrows, deformation of the bottles 5 can be exactly detected. For testing flat-typed bottle 5 as shown in FIG. 8C, if the nozzles 3a and 3b are to be arranged oppositely so as to obtain the same resonance frequency for each nozzle for a normal shape of the bottle, the deformation can be similarly detected.

The test results are further affected by the flux of delivered gas, the kind of gas and the temperature of filled gas etc. It is desirable that the flux of the delivered gas is reduced as far as possible to raise the measurement accuracy so that a pure resonance tone is generated to detect a sinusoidal electric signal. As mentioned above, resonance to the fundamental resonance frequency is most useful. In the case of the kind of gas, the test result for the same bottle 5 varies, by a resonance frequency 1 to 2 Hz., for the air and for carbonic acid gas. However, this condition is out of the question since the same kind of gas brings the same test result. In case of the temperature of the gas, the resonance frequency $f_r$ varies about several Hz. for the temperature deviation of several tens of degrees on Celsius temperature scale. This deviation is affected by respective deviations of the internal volume, of the shape of the bottle and of the speed of acoustic wave etc. However, this deviation is actually avoidable since the temperature of the surrounding air can be easily maintained at a substantial constant value.

What we claim is:

1. A system for determining the internal volume or deformation of a bottle, comprising nozzle means for delivering a uniform flow of gas, means for locating said nozzle means in position to direct said flow of gas to an edge at the opening of the bottle to generate an edge tone including a number of frequency components which excite the gas in the bottle, means for adjusting the flow rate of said gas from said nozzle means so as to generate a pure resonant tone from the bottle in response to said excitation, and means for detecting and measuring the frequency of said resonant tone to determine the internal volume or deformation of the bottle by a predetermined relationship between deviation of the internal volume and of the resonant frequency.

2. A system according to claim 1, in which said edge comprises an edge of a thin plate located at the opening of said bottle and having opposite surfaces disposed substantially in the direction of said flow of gas from said nozzle means.

3. A system according to claim 1, in which said detection means comprises means providing a constant reference frequency and means for measuring a beat frequency between said resonant tone and said reference frequency.

4. A system according to claim 3, in which said means providing said reference frequency comprises an organ pipe.

5. A system according to claim 3, in which said means providing said reference frequency comprises an oscillator generating an electric signal.

6. A system according to claim 5, comprising a frequency converter for producing said beat frequency.

7. A system according to claim 1, further comprising means for rotating said bottle while maintaining said position between said nozzle means and the opening of the bottle.

8. A system according to claim 1, in which said nozzle means comprises a plurality of nozzles similarly located around the opening of the bottle and means for delivering a uniform flow of gas successively to said nozzles.

References Cited

UNITED STATES PATENTS

| | | | |
|---|---|---|---|
| 2,285,151 | 6/1942 | Firestone | 73—149 |
| 2,491,418 | 12/1949 | Schlesman | 73—149 XR |
| 2,666,326 | 1/1954 | Poole et al. | 73—149 |
| 3,060,735 | 10/1962 | Baker | 73—149 |
| 3,324,716 | 6/1967 | Roberts | 73—149 |

LOUIS R. PRINCE, Primary Examiner

W. A. HENRY II, Assistant Examiner